(12) United States Patent
Zhang et al.

(10) Patent No.: US 11,594,921 B2
(45) Date of Patent: Feb. 28, 2023

(54) ELECTRIC MACHINE WITH NOISE-REDUCING ROTOR NOTCHES

(71) Applicant: GM GLOBAL TECHNOLOGY OPERATIONS LLC, Detroit, MI (US)

(72) Inventors: Peng Zhang, Rochester, MI (US); Song He, Troy, MI (US); Michael C. Muir, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 502 days.

(21) Appl. No.: 16/710,787

(22) Filed: Dec. 11, 2019

(65) Prior Publication Data

US 2021/0184520 A1    Jun. 17, 2021

(51) Int. Cl.
| | |
|---|---|
| H02K 1/24 | (2006.01) |
| H02K 1/16 | (2006.01) |
| H02K 1/27 | (2022.01) |
| H02K 7/00 | (2006.01) |
| H02K 1/276 | (2022.01) |
| H02K 29/03 | (2006.01) |

(52) U.S. Cl.
CPC ............... H02K 1/24 (2013.01); H02K 1/165 (2013.01); H02K 1/276 (2013.01); H02K 7/006 (2013.01); H02K 29/03 (2013.01)

(58) Field of Classification Search
CPC .......... H02K 1/165; H02K 1/24; H02K 1/276; H02K 1/2766; H02K 2213/03; H02K 29/03; H02K 7/006
USPC ......................................................... 310/152
See application file for complete search history.

(56) References Cited

U.S. PATENT DOCUMENTS

| | | | | |
|---|---|---|---|---|
| 4,532,447 A | * | 7/1985 | Cibie ..................... | H02K 51/00 336/131 |
| 6,858,961 B2 | * | 2/2005 | Tagome ............... | H02K 1/2786 310/156.55 |
| 7,932,658 B2 | * | 4/2011 | Ionel ..................... | H02K 1/276 310/156.52 |
| 8,405,271 B2 | * | 3/2013 | Lee ........................ | H02K 29/03 310/156.53 |
| 8,816,555 B2 | * | 8/2014 | Zhou ..................... | H02K 29/03 310/156.56 |
| 9,184,636 B2 | * | 11/2015 | Aoyama ................ | H02K 21/14 |
| 9,214,838 B2 | * | 12/2015 | Li .......................... | H02K 29/03 |
| 9,236,775 B2 | * | 1/2016 | Takahashi ............. | H02K 29/03 |

(Continued)

*Primary Examiner* — Alex W Mok
(74) *Attorney, Agent, or Firm* — Quinn IP Law

(57) ABSTRACT

A rotor assembly for an electric machine, e.g., of an electrified powertrain, includes a rotor having inner and outer diameter surfaces, and a rotor shaft connected to and surrounded by the rotor. The rotor has equally-spaced rotor magnetic poles each having a quadrature-axis ("q-axis") and a pair of direct-axes ("d-axes"). At each of magnetic pole of the rotor, the rotor defines at least three arcuate notches, including a center notch bisected by the q-axis and a pair of additional arcuate notches symmetrically flanking the center notch. The rotor may include embedded permanent magnets, which may be arranged in a dual V-shaped configuration. Each additional notch may be positioned within a sweep of a top-layer opening angle of the magnets. The center notch and/or the pair of additional notches may define tangentially-continuous fillets which smoothly transition the notch into the outer diameter surface.

19 Claims, 3 Drawing Sheets

(56) References Cited

U.S. PATENT DOCUMENTS

| | | | |
|---|---|---|---|
| 9,300,176 B2* | 3/2016 | Saito | B60L 15/025 |
| 9,742,251 B2* | 8/2017 | Laldin | H02K 21/14 |
| 9,812,913 B2* | 11/2017 | Saito | H02K 1/276 |
| 9,985,484 B2* | 5/2018 | Liang | H02K 1/2766 |
| 2017/0063187 A1* | 3/2017 | Hao | H02K 21/14 |

* cited by examiner

ELECTRIC MACHINE WITH NOISE-REDUCING ROTOR NOTCHES

INTRODUCTION

Electric traction motors, generators, and motor generator units are collectively referred to in the art as rotary electric machines. In a typical radial flux machine, a cylindrical stator circumscribes a cylindrical rotor, with the stator and rotor spaced a short distance apart from each other by a radial airgap. Equally-spaced stator teeth project radially inward toward an outer diameter surface of the rotor, with adjacent stator teeth being separated from one other by a respective stator slot. Each stator slot is filled with conductive wires or solid bar segments to thereby form a set of stator windings. In a polyphase embodiment of the electric machine, an alternating current input voltage is applied to the stator windings via corresponding phase leads. The energized stator thereafter generates a rotating stator magnetic field.

In an interior permanent magnet ("IPM") electric machine, individual lamination layers forming the core structure of the rotor are embedded with purposefully-arranged permanent magnets, e.g., double V-configurations of magnets constructed from neodymium-iron-boron ("NdFeB"), Samarium Cobalt ("SmCo"), ferrite, or another magnetic material having magnetic properties that are well-suited to the application. Unlike electromagnets resulting from sequential energization of the stator windings, the embedded rotor magnets collectively establish a time-invariant rotor magnetic field. The stator and rotor magnetic fields interact to produce and sustain motive forces within the above-noted stator-rotor airgap, with the generated gap forces ultimately imparting rotation to the rotor and a connected rotor shaft. Permanent Magnet Synchronous Reluctance Motors ("PM-SRMs") are also available for applications requiring relatively high-speed operation, power density, and efficiency.

Rotary electric machines are primary sources of radiated noise in many applications, including in electrified powertrains in which one or more electric machines are employed as torque sources, e.g., as high-voltage propulsion motors. Such machine noise tends to be most prevalent at dominant winding and torque ripple orders, for instance at three harmonics of a pole pass order for an exemplary three-phase electric machine. Typical electric and hybrid electric vehicle powertrains tend to skew the rotor or stator in an effort toward minimizing undesirable noise, vibration, and harshness ("NVH") effects. However, such skewing techniques may have the undesirable effect of reducing overall machine performance and operating efficiency. A similar result may follow from imposition of more stringent NVH constraints in the machine's overall electromagnetic design. A need therefore exists for a more efficient approach to reducing harmonic noise within an electrified powertrain employing a rotary electric machine.

SUMMARY

The present disclosure relates to improved rotor designs for reducing noise, vibration, and harshness ("NVH") effects in an electrified powertrain employing a rotary electric machine. In an exemplary motor vehicle application, for instance, the electrified powertrain may be used to propel a vehicle along a road surface. As noted above, primary components of a rotary electric machine include a cylindrical stator and rotor. The stator may surround or circumscribe the rotor in a typical radial flux configuration, such that a radial stator-rotor airgap is defined between an outer diameter surface of the rotor and an inner diameter surface of the stator. A possible embodiment of the rotor includes sets of permanent magnets embedded within corresponding cavities of the rotor, e.g., as double V-configurations for each rotor pole. The stator includes stator windings disposed in stator slots, with such stator slots opening into the radial stator-rotor airgap.

In order to provide the various benefits disclosed herein, and specifically to reduce targeted NVH orders, the outer diameter surface of the rotor is modified to define arcuate notches that are symmetric for each rotor pole. The rotor notches may extend along the entirety of an axial length of the rotor, or the notches may be isolated to specific lamination layers in different embodiments. At least three rotor notches are used at each magnetic pole of the rotor, with additional pairs of rotor notches possibly added in other embodiments. The electric machine according to an exemplary embodiment has eight rotor poles and seventy-two stator slots, with eighteen stator teeth per rotor pole pair. Other embodiments of the electric machine may be envisioned within the scope of the disclosure, which when equipped with the disclosed rotor notches would likewise benefit from reduced NVH effects as set forth herein.

As will be appreciated by one of ordinary skill in the art, each of an electric machine's rotor poles has a quadrature axes ("q-axis") and direct-axes ("d-axes"), with the d-axes and q-axis forming a rotating frame of reference. At each of the rotor poles, magnetic flux is produced by the stator windings along the d-axes. At the same time, motor torque is produced along the q-axis between the rotor poles. The rotor notches contemplated herein include, for each rotor pole, a notch aligned with and bisected by the q-axis ("q-axis notch"). The q-axis notch is symmetrically flanked by an additional pair of rotor notches positioned a calibrated angular distance away from the pole's d-axis ("d-axis notches"). The single q-axis notch thus forms a center notch at a respective rotor pole, with at least one d-axis notch positioned on each side of the q-axis/center notch.

One or more pairs of additional notches may flank the center notch in certain embodiments, e.g., the rotor may have a total of five notches per rotor pole when two pair of additional notches are used. Collectively, inclusion of the disclosed rotor notches at each of the rotor's magnetic poles significantly reduces machine noise without impacting motor torque and efficiency.

The particular size, shape, and/or position of the rotor notches may be adjusted for a given application in order to maximize noise reduction at targeted orders and evenly distribute vibration energy throughout the electric machine. The notches may be arcuate, e.g., circular, elliptical, or polynomial. Optionally, tangentially-continuous fillets or another suitable transition contour may be used with the notches to smoothly transition or blend the notch into the rotor's outer diameter surface. Such fillets may help avoid rotor stress concentration and noise, particularly at higher machine speeds.

In an exemplary embodiment, a rotor assembly for an electric machine includes a cylindrical rotor and a rotor shaft. The rotor, which has inner and outer diameter surfaces, includes a plurality of equally-spaced rotor magnetic poles each having a quadrature-axis ("q-axis"). The rotor shaft is connected to the inner diameter surface and is surrounded by the rotor. Such a rotor shaft rotates about the axis of rotation in conjunction with the rotor when the stator of the electric machine is energized. At each equally-spaced rotor magnetic pole, the rotor defines at least three arcuate notches, including a center notch bisected by the q-axis of the pole and a pair of additional arcuate notches symmetrically flanking the center notch.

The rotor in some embodiments includes multiple sets of permanent magnets embedded within the rotor proximate the outer diameter surface. Such magnets form the equally-spaced rotor magnetic poles.

At each of the equally-spaced rotor magnetic poles, the permanent magnets may be optionally arranged in a dual V-shaped configuration when the rotor is viewed along the axis of rotation. Such a magnet configuration, as understood in the art, defines respective top-layer magnet opening angles on either opposing side of the rotor pole. Each notch of the pair of additional notches may be positioned within a sweep or angular range of one of the respective top-layer opening angles.

The electric machine has a stator with N stator slots. The pair of additional notches may be located about 360/N degrees away from a closest d-axis to thereby reduce an $N^{th}$ torque ripple order harmonic, e.g., within the range of 345-375 degrees. The stator may have 72 slots in some embodiments, i.e., N=72. Other numbers of stator slots may be used in other embodiments. 360/N may be provide an optimized response in certain applications.

The pair of additional notches symmetrically flanking the center notch at each rotor pole may have the same size and shape. The center notch may have the same size and shape as the pair of additional notches in some configurations, or the center notch may have a different size and/or shape.

In certain configurations, the center notch and the pair of additional notches may define tangentially-continuous fillets which smoothly transition the notch into the outer diameter surface.

Also disclosed herein is a rotary electric machine. An embodiment of the machine includes a rotor circumscribed by a stator, and having inner and outer diameter surfaces. The rotor includes equally-spaced rotor magnetic poles each having a respective q-axis. A rotor shaft is connected to the inner diameter surface of the rotor and surrounded by the rotor, and is configured to rotate about the axis of rotation in conjunction with the rotor whenever the stator is energized. As noted above, at each of the equally-spaced rotor magnetic poles, the rotor defines at least three arcuate notches, including a center notch bisected by the q-axis and a pair of additional arcuate notches symmetrically flanking the center notch.

An electrified powertrain is also disclosed. The powertrain may include a traction power inverter module ("TPIM") connected to a battery pack and configured to change a direct current ("DC") voltage from the battery pack to an alternating current ("AC") voltage. The powertrain also includes a rotary electric machine as set forth above, which is energized by the AC voltage from the TPIM. A transmission is coupled to the rotor shaft and powered by the electric machine.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
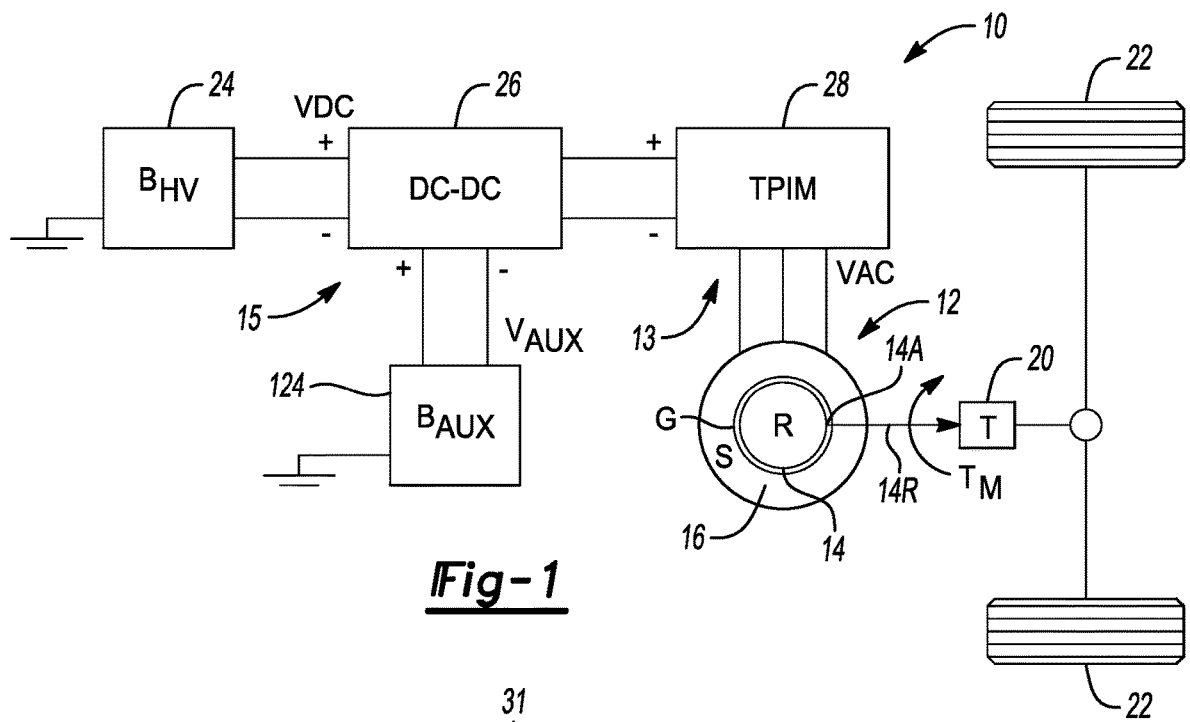
FIG. 1 is a schematic illustration of an electrified powertrain having a rotary electric machine whose rotor is structured with noise-reducing peripheral notches as set forth herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, an electrified powertrain 10 is depicted schematically in FIG. 1, e.g., for use aboard an exemplary motor vehicle 11. The powertrain 10 includes a rotary electric machine 12 having a rotor assembly 14A and a stator 16. When the stator 16 is energized, the rotor assembly 14A supplies motor torque (arrow $T_M$) to a transmission ("T") 20, e.g., a stepped-gear automatic transmission. Although omitted for illustrative simplicity, the electrified powertrain 10 may also include an internal combustion engine configured to generate engine torque. When so equipped, the generated engine torque is selectively provided to the transmission 20, either alone or in conjunction with the motor torque (arrow $T_M$) from the electric machine 12.

In order to reduce targeted noise, vibration, and harshness ("NVH") orders in the electric machine 12, a peripheral outer diameter surface 30 of a rotor 14 of the rotor assembly 14A is modified to define concavities or notches 40 (see FIG. 2) that are symmetrical at a given rotor pole. As will be appreciated by one of ordinary skill in the art, the electric machine 10 has a direct-axis ("d-axis") and a quadrature axis ("q-axis") as noted above. The disclosed notches are arranged on or with respect to such axes in the manner depicted in FIGS. 2-5 as set forth below.

When the vehicle 11 of FIG. 1 is embodied as a hybrid electric vehicle, the electric machine 12 and/or the engine may power the transmission 20. Alternatively, the vehicle 11 may be a battery electric vehicle, in which case the transmission 20 may be powered solely by the motor torque (arrow $T_M$) from the electric machine 12. The disclosed improvements relate to the construction of the electric machine 12, and may be realized in HEV and EV embodiments of the vehicle 11 without limitation, as well as in non-vehicular applications such as power plants, hoists, mobile platforms and robots, etc.

The rotor assembly 14A of the electric machine 12 is positioned adjacent to the stator 16 and separated therefrom by an airgap G, with such an airgap G forming a magnetic flux barrier. The stator 16 and the rotor 14 of rotor assembly 14A may be constructed from a stack-up of thin lamination layers, e.g., electrical steel or another ferrous material, with each layer typically being about 0.2 mm-0.5 mm thick as will be appreciated by those of ordinary skill in the art. The rotor assembly 14A according to a non-limiting exemplary embodiment is arranged concentrically within the stator 16 such that the stator 16 circumscribes the rotor assembly 14A. In such an embodiment, the airgap G is a radial airgap and the electric machine 12 embodies a radial flux-type machine. However, other embodiments may be realized in which the relative positions of the rotor assembly 14A and stator 16 are reversed. For illustrative consistency, the embodiment of FIG. 1 in which the rotor assembly 14A resides radially within the stator 16 will be described hereinafter without limiting the construction to such a configuration.

Figure 3:
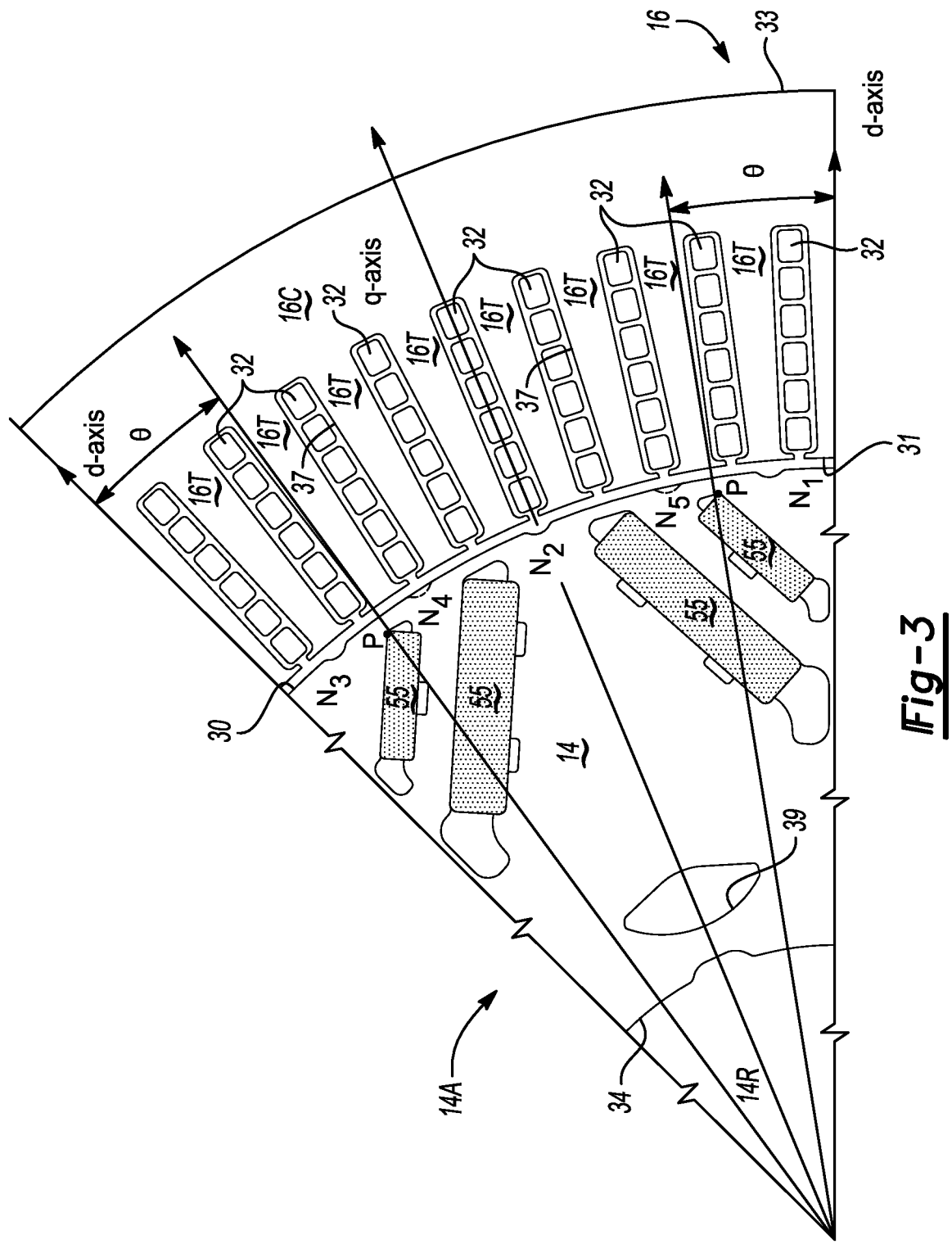
FIG. 3 is a schematic illustration of an exemplary pole of the rotor shown in FIG. 2 depicting embedded permanent magnets arranged in a V-configuration.

The rotor 14 shown schematically in FIG. 1 optionally includes an embedded set of permanent magnets collectively referred to herein as rotor magnets 55 (see FIG. 3). The electric machine 12 in such an embodiment is an interior permanent magnet ("IPM") machine, or alternatively a synchronous reluctance machine. The rotor magnets 55 may be constructed, for example, of ferrite, Neodymium-iron-boron, Samarium cobalt, aluminum-nickel-cobalt, etc., or another application-suitable material. The rotor magnets 55 in such embodiment are embedded within individual steel lamination layers of the rotor 14 and may have one or multiple layers in different embodiments. Therefore, the illustrated configuration of the rotor magnets 55 is exemplary of one possible way to implement an IPM machine.

With continued reference to the exemplary vehicle 11 of FIG. 1, the electrified powertrain 10 may include an alternating current ("AC") voltage bus 13. The AC voltage bus 13 may be selectively energized via a traction power inverter module ("TPIM") 28 using a high-voltage battery pack ("BHV") 24, for instance a lithium ion, lithium sulfur, nickel metal hydride, or other high-energy voltage supply. The AC voltage bus 13 conducts an AC bus voltage ("VAC") to or from the electric machine 12. The motor torque (arrow $T_M$) from the energized electric machine 12, when operating in a drive or motoring mode, is imparted to a rotor shaft 14R of the rotor assembly 14A, with the rotor shaft 14R journaled, splined, or otherwise connected to an inner diameter surface 34 of the rotor 14. The motor torque (arrow $T_M$) is then directed to a coupled load, such as the transmission 20 and/or one or more road wheels 22.

The electrified powertrain 10 may also include a direct current-to-direct current ("DC-DC") converter 26 configured to reduce or increase a relatively high DC bus voltage ("VDC") as needed. The DC-DC converter 26 is connected between the battery pack 24 and the TPIM 28 via positive (+) and negative (−) rails of a corresponding DC voltage bus 15. In some configurations, an auxiliary battery pack ("BAux") 124 may be connected to the DC-DC converter 26, with the auxiliary battery pack 124 possibly being embodied as a lead-acid battery or a battery constructed of another application-suitable chemistry and configured to store or supply a 12-15V auxiliary voltage ("VAux") to one or more connected auxiliary devices (not shown).

Figure 2:
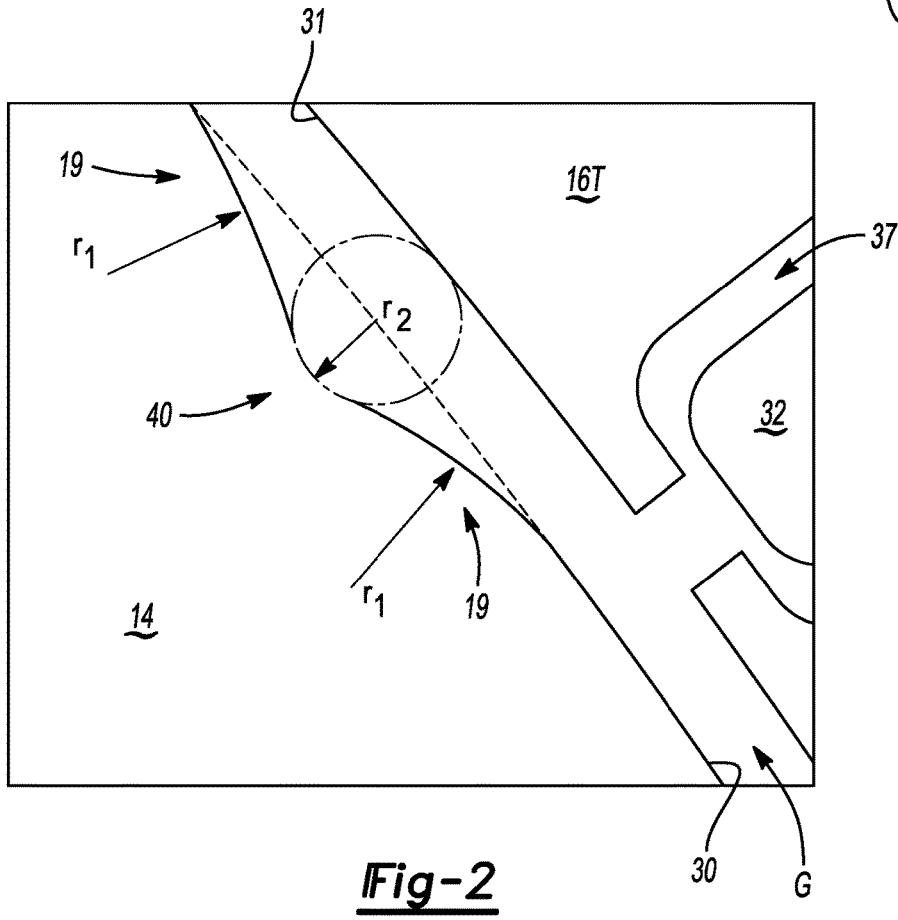
FIG. 2 is a schematic illustration of an exemplary notch configuration for use with the rotor shown in FIG. 1.

Referring to FIGS. 2 and 3, the stator 16 of FIG. 1 has radially-projecting stator teeth 16T extending inward from a cylindrical stator housing or core 16C (FIG. 3). That is, the stator teeth 16T extend from the stator core 16C of FIG. 3, which has an annular outer diameter surface 33, inward toward the outer diameter surface 30 of the rotor 14. An inner diameter surface 31 of the stator 16 is the radially-innermost surface of the stator teeth 16T. Adjacent stator teeth 16T are separated from each other by a corresponding stator slot 37, as will be appreciated by those of ordinary skill in the art. The stator slots 37 are substantially filled with an electrical conductor, typically copper wires or copper bars/"hairpins". Such conductors collectively form stator windings 32. A rotating stator magnetic field is generated when the stator windings 32 are sequentially-energized by a polyphase output voltage from the TPIM 28 of FIG. 1. Stator magnetic poles formed from the resulting rotating stator field interact with rotor poles provided by the various groupings of the rotor magnets 55 to rotate the rotor shaft 14R of FIGS. 1 and 3 and a load coupled thereto, e.g., the road wheels 22.

The number, type, position, and/or relative orientation of the rotor magnets 55 ultimately influences the magnitude and distribution of magnetic flux in the ferrous materials of the electric machine 12. The rotor magnets 55 may be arranged as shown in a generally V-shaped configuration when the rotor 14 is viewed along its axis of rotation. In such a V-configuration, ends of the rotor magnets 55 are adjacent to the outer diameter surface 30 of the rotor 14 are spaced closer together than are the opposing ends of the rotor magnets 55 located closer to the rotor shaft 14R (see FIG. 3). Also when viewed axially as in FIG. 3, the rotor magnets 55 may be symmetrically distributed with respect to the q-axis, with a larger first pair of the rotor magnets 55, e.g., rectangular bar magnets arranged in a dual V-pattern as shown positioned adjacent to the q-axis for a given rotor pole. The first pair of rotor magnets 55 is flanked by a smaller second pair of the rotor magnets 55, which is likewise arranged in the typical dual V configuration depicted in FIG. 3.

As shown in the close-up view in FIG. 2, in order to provide the various NVH reduction benefits disclosed herein, the peripheral outer diameter surface 30 of the rotor 14 is modified to define evenly-spaced notch features 40. The notches 40 are arranged in a symmetrical manner in each magnetic pole of the rotor 14, and may have the same or different sizes and/or shapes. Therefore, the illustrated sizes and shapes are exemplary of the present teachings and non-limiting.

With respect to the outer diameter surface 30, each rotor notch 40 has a notch width $r_1$ and a notch depth $r_2$, with $r_1 > r_2$ for optimal NVH reduction. Other embodiments may be envisioned, however, in which $r_1 \leq r_2$, which may have sufficient utility in certain applications. The width $r_1$ of each notch 40 provides a smooth, tangentially continuous transition to the outer diameter surface 30 of the rotor 14 to reduce stress concentration in the rotor 14. Non-tangential/non-smooth curvatures or other transition profiles may be used in other embodiments as a tradeoff between NVH benefits and stress/manufacturing simplicity.

FIG. 3 depicts a single magnetic pole of the rotor 14 of rotor assembly 14A. The rotor 14 may define air cavities 39 proximate the rotor shaft 14R, e.g., to reduce weight, with one such air cavity 39 visible from the perspective of FIG. 3. As will be appreciated by those of ordinary skill in the art, the depiction in FIG. 3 is representative of an eight-pole embodiment of the rotor 14, with the remaining seven poles being identical to the exemplary pole of FIG. 3 and thus omitted for illustrative simplicity and clarity. The disclosed rotor notches 40 can be used in a wide range of machine configurations, however, including different combinations of rotor poles (e.g., four, six, eight, ten, etc.) and stator slots (e.g., twenty-four, thirty-six, forty-eight, seventy-two, etc.). The eight-pole embodiment of FIG. 3 is therefore non-limiting and illustrative of just one possible configuration.

The rotor notches 40 contemplated herein include, for each rotor pole, a center q-axis notch $N_2$ and at least one pair of additional d-axis notches $N_1$ and $N_3$ symmetrically flanking the q-axis notch $N_2$. As used herein, the term "symmetrically flanking" refers to the d-axis notches $N_1$ and $N_3$ being equidistant from the q-axis notch $N_2$. One or more additional pairs of notches 40 may be used at each rotor pole in other embodiments, with notches $N_4$ and $N_5$ being representative of such an additional pair.

In terms of relative position of the center q-axis notch $N_2$ and flanking d-axis notches $N_1$ and $N_3$, the q-axis bisects the q-axis notch $N_2$ as shown. As will be appreciated, a line drawn from the center of the rotor shaft 14R through the radially-outermost corner (point P) of the top-layer permanent magnets 55 defines a top-layer magnet opening angle θ on either side of the rotor pole. The rotor notches $N_1$ and $N_3$ are positioned within the sweep or angular range of the respective opening angle θ to ensure maximum interaction with magnetic flux. Additional rotor notches $N_4$ and $N_5$, if used, may be positioned outside of the sweep of the top-layer magnet opening angle θ. For an electric machine 12 having N slots in its stator 16, the flanking d-axis notches 40, i.e., $N_1$ and $N_3$ of FIGS. 4 and 5, may be located 360/N degrees away from the d-axis to significantly reduce the $N^{th}$ torque rippled order harmonic. For instance, a 72-slot embodiment of the electric machine 12 could position its flanking d-axis notches $N_1$ and $N_3$ at an angular distance of 360/72=5 degrees away from each d-axis depicted in FIG. 3.

With respect to the surface profile geometry of the rotor notches 40, the size and shape of the notches 40 may be tailored to a given application in order to maximize noise reduction and evenly distribute vibration energy in the electric machine 12 of FIG. 1. Collectively, inclusion of the notches 40 at each rotor pole of the electric machine 12 significantly reduces machine noise without impacting motor torque and efficiency. In various embodiments, the notches 40 may be circular, elliptical, or polynomial arcuate features. Tangentially-continuous fillets 19 as shown in FIG. 2, or another suitable transition profile or contour, may be used with the notches 40 to provide a smooth transition to neighboring "un-notched" areas of the outer diameter surface 30. Such fillets 19 would help avoid rotor stress concentration and noise, particularly at higher rotational speeds of the rotor assembly 14A.

Figure 5:
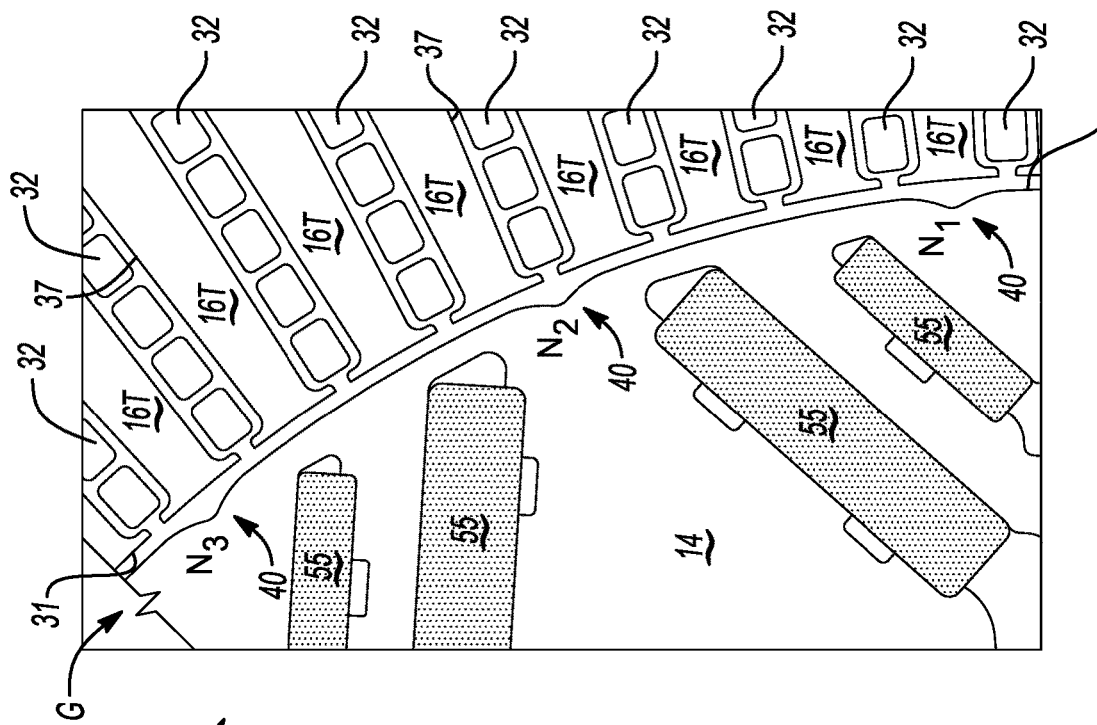
FIGS. 4 and 5 are schematic illustrations of alternative rotor notches usable as part of the representative electrified powertrain of FIG. 1.
Figure 4:
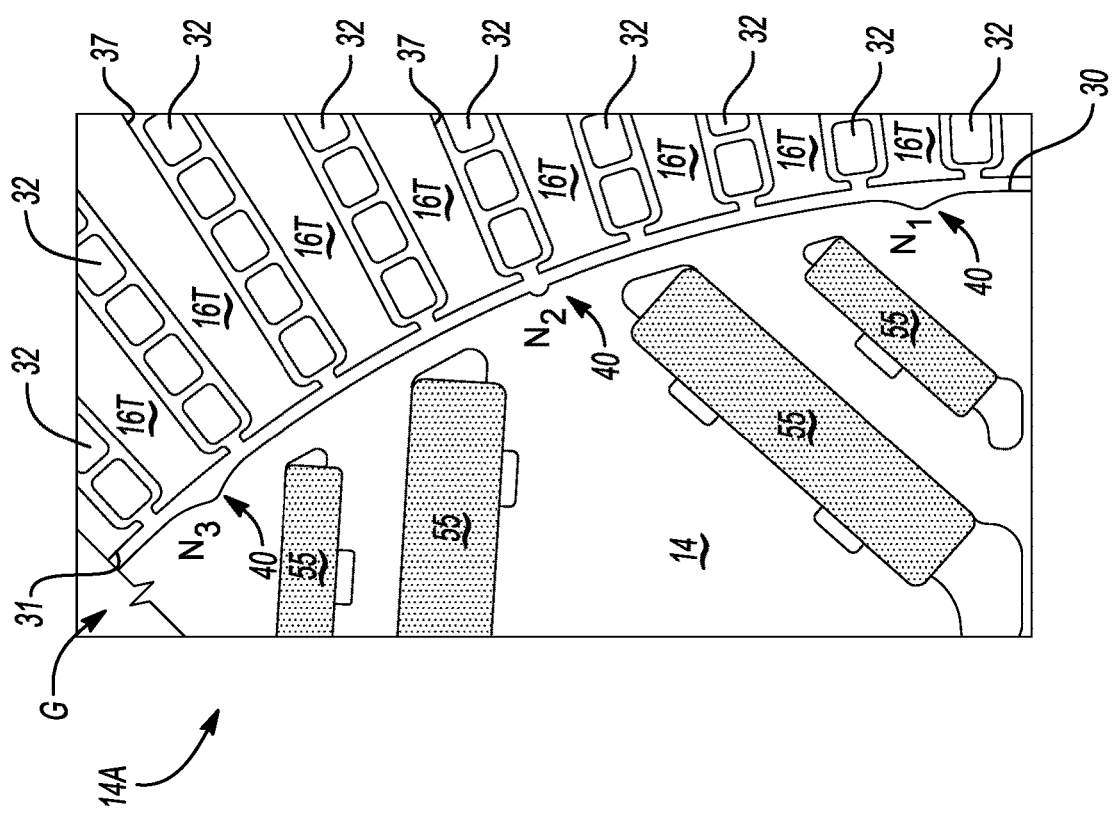

FIGS. 4 and 5 depict two possible embodiments of the rotor notches 40, i.e., the center q-axis notch $N_2$ and the d-axis notches $N_1$ and $N_3$ symmetrically flanking the q-axis notch $N_2$. In the configuration of FIG. 4, the q-axis notch $N_2$ has a different size and shape relative to the flanking notches $N_1$ and $N_3$. For instance, the q-axis notch $N_2$ may be a circular notch lacking the fillets 19 of FIG. 2, while the flanking notches $N_1$ and $N_3$ have the filleted appearance of the notch 40 shown in FIG. 2. Such a configuration may be used to reduce NVH effects relative to rotor assemblies lacking the disclosed notches 40.

Alternatively, the notches $N_1$, $N_2$, and $N_3$ may have the same size and shape, for instance as depicted in FIG. 5. When the notches $N_1$, $N_2$, and $N_3$ are equally sized and similarly shaped, particularly when the notches 40 are filleted as shown, the electric machine 12 of FIG. 1 may enjoy optimal noise reduction. However, one of ordinary skill in the art will appreciate that the filleted contour of the notches 40 would require more complex processing when forming the individual lamination layers of the rotor 14 relative to the circular shape of the q-axis notch $N_2$ in FIG. 4. The choice of shape, size, and location is therefore made as a performance-manufacturing tradeoff.

Likewise, formation of the rotor assembly 14 from a stack of lamination layers having the same perimeter shape would facilitate manufacturing, with the result of such a construction being elongated notches 40 extending along the longitudinal axis of rotation of the rotor assembly 14A. Alternatively, two sets of rotor lamination layers may be formed, with one set having the perimeter shapes shown in FIG. 4 or 5 and another set being circular, and thus lacking the notches 40. In such an embodiment, lamination layers having the notches 40 may be positioned at targeted axial locations of the rotor 14. Such an approach may enable a more targeted reduction in certain NVH effects and harmonic orders thereof.

As will be appreciated by one of ordinary skill in the art in view of the foregoing disclosure, incorporation of the disclosed rotor notches 40 into the rotor 14 of FIG. 1 may provide the advantage of reducing tonal noise at targeted winding and slot orders. The formation of the notches 40 effectively enlarges the airgap G of FIG. 2, however, which reduces the torque capability of the electric machine 12. Therefore, the size and number of such rotor notches 40 should be minimized, e.g., to three rotor notches 40 per rotor pole, in order to ensure minimal degradation of torque performance. The teachings may be applied in suitably constructed rotor assemblies 14 to reduce specific harmonic orders, including those of IPM machines and synchronous reluctance machines. No additional processes are required once the desired surface geometry is applied to the rotor assembly 14 during stamping of the rotor's lamination layers.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A rotor assembly for an electric machine, comprising:
a rotor having an inner diameter surface and an outer diameter surface, wherein the rotor includes a plurality of equally-spaced rotor magnetic poles each having a quadrature-axis ("q-axis") and a pair of direct-axes ("d-axes");
a rotor shaft connected to the inner diameter surface and surrounded by the rotor, and configured to rotate about an axis of rotation in conjunction with the rotor when a stator of the electric machine is energized;
wherein, at each of the equally-spaced rotor magnetic poles, the rotor defines at least three arcuate notches, including a center notch bisected by the respective q-axis and a pair of additional arcuate notches symmetrically flanking the center notch, and wherein each of the additional arcuate notches is located a calibrated angular distance away from a respective one of the d-axes; and
wherein:
the rotor includes multiple sets of permanent magnets embedded within the rotor proximate the outer diameter surface of the rotor to thereby form the equally-spaced rotor magnetic poles;

at each of the equally-spaced rotor magnetic poles, the permanent magnets are arranged in a dual V-shaped configuration when the rotor is viewed along the axis of rotation to thereby define respective top-layer magnet opening angles on either side of the respective rotor magnetic poles;

the dual V-shaped configuration of the permanent magnets is pointed toward the outer diameter surface of the rotor;

each of the permanent magnets are positioned between the respective q-axis and the respective d-axes such that the dual V-shaped configuration has a vertex relative to the respective q-axis;

the pair of additional arcuate notches symmetrically flanking the center notch have the same size and shape; and the center notch has the same size and shape as the pair of additional arcuate notches.

2. The rotor assembly of claim 1, wherein each notch of the pair of additional arcuate notches is positioned within a sweep of one of the respective top-layer magnet opening angles.

3. The rotor assembly of claim 2, wherein the electric machine has the stator with N stator slots, and the pair of additional arcuate notches are located about 360/N degrees away from a closest d-axis of the d-axes to thereby reduce an $N^{th}$ torque ripple order harmonic.

4. The rotor assembly of claim 3, wherein N=72.

5. The rotor assembly of claim 1, wherein the center notch and the pair of additional arcuate notches each define tangentially-continuous fillets which smoothly transition the center notch and the pair of additional arcuate notches into the outer diameter surface.

6. A rotary electric machine, comprising:
a stator;
a rotor circumscribed by the stator, and having an inner diameter surface and an outer diameter surface, wherein the rotor includes a plurality of equally-spaced rotor magnetic poles each having a quadrature-axis ("q-axis") and a pair of direct-axes ("d-axes");
a rotor shaft connected to the inner diameter surface, surrounded by the rotor, and configured to rotate about an axis of rotation in conjunction with the rotor when the stator is energized;
wherein, at each of the equally-spaced rotor magnetic poles, the rotor defines at least three arcuate notches, including a center notch bisected by the respective q-axis and a pair of additional arcuate notches symmetrically flanking the center notch, and wherein each of the additional arcuate notches is located a calibrated angular distance away from a respective one of the d-axes; and
wherein:
the rotor includes multiple sets of permanent magnets embedded within the rotor proximate the outer diameter surface of the rotor to thereby form the equally-spaced rotor magnetic poles;
at each of the equally-spaced rotor magnetic poles, the permanent magnets are arranged in a dual V-shaped configuration when the rotor is viewed along the axis of rotation to thereby define respective top-layer magnet opening angles on either side of the respective rotor magnetic poles;
the dual V-shaped configuration of the permanent magnets is pointed toward the outer diameter surface of the rotor;

each of the permanent magnets are positioned between the respective q-axis and the respective d-axes;

the pair of additional arcuate notches symmetrically flanking the center notch have the same size and shape; and the center notch has the same size and shape as the pair of additional arcuate notches.

7. The rotary electric machine of claim 6, wherein each notch of the pair of additional arcuate notches is positioned within a sweep of one of the respective top-layer magnetic opening angles.

8. The rotary electric machine of claim 7, wherein the stator defines N stator slots, and the pair of additional arcuate notches are located 360/N degrees away from a closest d-axis of the d-axes to thereby reduce an $N^{th}$ torque ripple order harmonic.

9. The rotary electric machine of claim 8, wherein N=72.

10. The rotary electric machine of claim 6, wherein the center notch and the pair of additional arcuate notches each define tangentially-continuous fillets which smoothly transition the center notch and the pair of additional arcuate notches into the outer diameter surface.

11. The rotary electric machine of claim 6 wherein each of the permanent magnets are positioned between the respective q-axis and the respective d-axes such that the dual V-shaped configuration has a vertex relative to the respective q-axis.

12. The rotary electric machine of claim 6 wherein the permanent magnets are symmetrically distributed relative to the respective q-axis.

13. An electrified powertrain comprising:
a battery pack;
a traction power inverter module ("TPIM") connected to the battery pack, and configured to change a direct current ("DC") voltage from the battery pack to an alternating current ("AC") voltage;
a rotary electric machine energized by the AC voltage from the TPIM, and including:
a stator;
a rotor circumscribed by the stator, and having an inner diameter surface and an outer diameter surface, wherein the rotor includes a plurality of equally-spaced rotor magnetic poles each having a quadrature-axis ("q-axis") and a pair of direct-axes ("d-axes"); and
a rotor shaft connected to and surrounded by the rotor, and configured to rotate about an axis of rotation in conjunction with the rotor when the electric machine is energized;
a transmission coupled to the rotor shaft and powered by the electric machine;
wherein, at each of the equally-spaced rotor magnetic poles, the rotor defines at least three arcuate notches, including a center notch bisected by the respective q-axis and a pair of additional arcuate notches symmetrically flanking the center notch, and wherein each of the additional arcuate notches is located a calibrated angular distance away from a respective one of the d-axes; and
wherein:
the rotor includes multiple sets of permanent magnets embedded within the rotor proximate the outer diameter surface of the rotor to thereby form the equally-spaced rotor magnetic poles;
at each of the equally-spaced rotor magnetic poles, the permanent magnets are arranged in a dual V-shaped configuration when the rotor is viewed along the axis of rotation to thereby define respective top-layer magnet opening angles on either side of the respective rotor poles;

each of the permanent magnets are positioned between the respective q-axis and the respective d-axes;

the pair of additional arcuate notches symmetrically flanking the center notch have the same size and shape; and the center notch has the same size and shape as the pair of additional arcuate notches.

14. The electrified powertrain of claim 13, wherein each notch of the pair of additional arcuate notches is positioned within a sweep of one of the respective top-layer magnet opening angles.

15. The electrified powertrain of claim 14, wherein the stator defines N stator slots, and the pair of additional arcuate notches are located 360/N degrees away from a closest d-axis of the d-axes to thereby reduce an $N^{th}$ torque ripple order harmonic.

16. The electrified powertrain of claim 15, wherein the at least three arcuate notches have the same size and shape as the pair of additional arcuate notches, and define tangentially-continuous fillets which smoothly transition the notches into the outer diameter surface of the rotor.

17. The electrified powertrain of claim 13 wherein each of the permanent magnets are positioned between the respective q-axis and the respective d-axes such that the dual V-shaped configuration has a vertex relative to the respective q-axis.

18. The electrified powertrain of claim 13 wherein the dual V-shaped configuration of the permanent magnets is pointed toward the outer diameter surface of the rotor.

19. The electrified powertrain of claim 13 wherein the permanent magnets are symmetrically distributed relative to the respective q-axis.

\* \* \* \* \*